United States Patent
Cuoq et al.

(10) Patent No.: US 10,047,301 B2
(45) Date of Patent: Aug. 14, 2018

(54) METHOD TO RESOLVE EMULSIONS FORMED DURING ETHYLENE MANUFACTURE

(71) Applicants: Ecolab USA Inc., St. Paul, MN (US); SABIC Global Technologies B.V., Bergen op Zoom (NL)

(72) Inventors: Fabrice Cuoq, Maaseik (BE); Steven Leen, Bree (BE); Jerome Vachon, Maastricht (NL); Anthoni van Zijl, Eindhoven (NL); Ian Robson, Middlesbrough (GB); Roy van Lier, Sittard (NL); Theodore C. Arnst, Sugar Land, TX (US)

(73) Assignees: ECOLAB USA INC., St. Paul, MN (US); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/291,511

(22) Filed: Oct. 12, 2016

(65) Prior Publication Data
US 2017/0101589 A1   Apr. 13, 2017

Related U.S. Application Data

(60) Provisional application No. 62/240,243, filed on Oct. 12, 2015.

(51) Int. Cl.
| | |
|---|---|
| *B01D 17/05* | (2006.01) |
| *C10G 75/04* | (2006.01) |
| *C08K 5/19* | (2006.01) |
| *C10G 33/04* | (2006.01) |
| *C02F 1/68* | (2006.01) |
| *B01D 17/04* | (2006.01) |
| *C02F 101/32* | (2006.01) |
| *C02F 101/36* | (2006.01) |
| *C02F 101/38* | (2006.01) |
| *C02F 103/36* | (2006.01) |

(52) U.S. Cl.
CPC .......... *C10G 33/04* (2013.01); *B01D 17/047* (2013.01); *C02F 1/68* (2013.01); *C02F 2101/325* (2013.01); *C02F 2101/36* (2013.01); *C02F 2101/38* (2013.01); *C02F 2103/365* (2013.01); *C02F 2303/08* (2013.01)

(58) Field of Classification Search
USPC ............ 523/503; 208/48 Q, 48 AA; 210/708
See application file for complete search history.

(56) References Cited

U.S. PATENT DOCUMENTS

| | | | |
|---|---|---|---|
| 3,475,458 A | 10/1969 | McClure | |
| 3,591,520 A | 7/1971 | McDonald | |
| 4,066,673 A | 1/1978 | Doughty et al. | |
| 5,445,743 A | 8/1995 | Rowe et al. | |
| 8,697,615 B2 | 4/2014 | Tekavec et al. | |
| 2005/0263437 A1* | 12/2005 | Howdeshell | C10G 75/04 208/48 AA |
| 2006/0289359 A1 | 12/2006 | Manek et al. | |
| 2011/0315604 A1 | 12/2011 | Nguyen | |
| 2015/0053622 A1 | 2/2015 | Zhang et al. | |

OTHER PUBLICATIONS

International Search Report dated Jan. 9, 2017 in connection with International Application No. PCT/US2016/056573, 4 pages.
James D. McClure, "Glycidyltrimethylammonium Chloride and Related Compounds", Journal of Organic Chemistry, vol. 35, No. 6, 1970, pp. 2059-2061.

* cited by examiner

*Primary Examiner* — Tae H Yoon
(74) *Attorney, Agent, or Firm* — Kagan Binder, PLLC

(57) ABSTRACT

Disclosed herein are methods for resolving emulsions formed from oils present in quench waters of ethylene manufacturing operations. The methods include adding a cationic oligomer to the base of a water quench tower having an emulsion formed therein, and collecting a water phase therefrom. The water phase can be applied to a water recycling loop within the manufacturing facility.

15 Claims, 4 Drawing Sheets

METHOD TO RESOLVE EMULSIONS FORMED DURING ETHYLENE MANUFACTURE

TECHNICAL FIELD

The invention is directed to compositions and methods for resolving (or breaking) emulsions formed from hydrocarbons present in quench water used in ethylene manufacturing operations.

BACKGROUND

In the production of petrochemicals, water is often used to control various chemical reactions, for example by transferring heat from process streams to quench reactions. When such water is subjected to intimate contact with a process stream, it is commonly referred to as process water. In ethylene manufacturing plants, steam is contacted with the process feedstock to control the pyrolysis (cracking) process by lowering the partial pressure of the hydrocarbon feedstock, improving the efficiency of the conversion reaction. Downstream of the pyrolysis reactors, a water quench tower is further employed to cool the gas leaving a primary fractionator or a transfer line exchanger.

In the base of the quench water tower or in a discrete water/oil separator, hot process water is separated from the hydrocarbon products that condense along with steam. These condensed hydrocarbon products are commonly referred to as pyrolysis gasoline, or pygas. The low-density, liquid hydrocarbons that comprise pygas rise to the top surface of the bulk liquid, where they are drawn off via a weir system and typically become part of a recycle stream or byproduct stream for export or further processing. The bulk phase is water containing both emulsified and dissolved light liquid hydrocarbons derived from the pygas. Once the emulsified hydrocarbons are substantially separated from the process water, the water can be recycled for use in the cracking and quenching process, while the pygas component can e.g. be returned to the primary fractionator as reflux or further processed for some other purpose. Ethylene plants that crack gaseous feedstock are generally constructed without a "primary fractionator" and in the absence of this process vessel there is an additional hydrocarbon condensate fraction that must be addressed. This other hydrocarbon fraction has been called "heavy pygas", "heavy hydrocarbon", or "pytar" (pyrolysis tar). This hydrocarbon fraction is denser than the process water and there are mechanical provisions for removing this fraction from the bottom of the oil/water separator.

Severe process conditions exist in the quench water tower system. Temperatures at the base of the quench tower can approach 100° C., for example about 60° C. to 100° C., for example about 80° C. to 90° C. Additionally, corrosion and fouling potential due to the presence of organic acids and oxygenates, polymerization potential, heat removal by "pumparounds", and a mixture of hydrogen, steam, and a mixture of pygas and in some embodiments also pytar are present during operation of these towers and contribute to the formation of the subject pygas emulsions.

Pygas and various other hydrocarbon contaminants can concentrate in the process water. Other contaminants include organic acids such as acetic, formic, propionic, and/or butyric acid that are formed during the cracking process. These are readily dissolved by the process water, providing a water phase having a pH of about 5-6 or less. Nevertheless, pH of 8-9 can also be encountered due to the presence of alkaline species, such as ammonia in the process water. If unchecked, the combined emulsified and dissolved compounds can lead to fouling, foaming, corrosion and product quality issues downstream and also upstream, due to the use of recycled process water, as quench water.

However, pygas or a portion thereof often becomes emulsified in the process water or a portion thereof, a problem familiar to those of skill in ethylene manufacturing. Such emulsions are difficult to address due to the harsh conditions present at the oil/water separator.

In ethylene production, the "Dilution Steam System" typically consists of a quench tower, an oil/water separator, a process water stripper to remove dissolved hydrocarbons, and a dilution steam generator. Steam from the dilution steam generator is sent to the pyrolysis furnace and is recovered as water in the quench tower. This complex water loop can experience a variety of problems due to process water contaminants. The inability to resolve, or demulsify, these pygas/process water emulsions results in an increase of fouling in the dilution steam generator and quench water exchangers, as well as increased stripping steam requirements in the process water stripper. The mixture of hydrocarbons found in a particular sampling of pygas will vary as a consequence of plant design, hydrocarbon feedstock, and plant operating conditions. For example, a plant designed to crack liquid naphtha feedstock will have a primary fractionator that captures and fractionates hydrocarbons with high boiling points, while steam and pygas vapors are passed through to the water quench tower where they are condensed; if the operation of the primary fractionator is changed, which results in a pygas with a higher distillation endpoint, the ethylene producer will typically be challenged by more stable emulsions due to the altered composition of the pygas.

A different example would be a plant designed to crack gaseous feedstocks; such a plant is designed to operate without a primary fractionator and accordingly, the oil/water separation unit is designed to remove a heavier-than-water hydrocarbon phase, as well as a lighter-than-water hydrocarbon phase. If such a plant is operated at high cracking severity, that is, at a higher temperature during pyrolysis to maximize ethylene yield, the proportion of pytar increases, which increases the likelihood of pytar droplets becoming entrained into the pygas fraction. It has been observed that increasing the pytar content of the pygas increases emulsion stability of the pygas-pytar mixture.

By way of example, in many cases the process water contains not only traces of styrene but also oligomers of styrene. Capturing styrene in the quench tower recycling loop exacerbates fouling by inducing its polymerization, leading eventually to deposition of the styrenic products on equipment surfaces.

The pygas emulsions with process water are distinct and different from those that are found in oil field produced water. Oil field produced waters contains asphaltenes, resins and very long chain paraffins. These hydrocarbon types are almost never found in ethylene quench waters.

There is a need in the industry to resolve, or demulsify, emulsions formed by pygas and process water within ethylene manufacturing plants. There is a need in the industry to resolve such emulsions quickly and using simple methodology.

SUMMARY

Disclosed herein is a method of resolving pygas emulsions. The method includes adding about 0.1 ppm to 200 ppm of a cationic oligomer to a pygas emulsion present within a water recycling loop of an ethylene manufacturing plant; and collecting a water phase resolved therefrom, wherein the cationic oligomer has a molecular weight of about 400 g/mol to 2000 g/mol and comprises repeat units derived from (2,3-epoxypropyl)trialkylammonium chloride). In some embodiments, the pygas emulsion is present in a water quench tower or in an oil/water separator. In some embodiments, the pygas emulsion is present in the base of the water quench tower at about 60° C. to 100° C. In some embodiments, the pygas emulsion comprises a pytar fraction. In some embodiments, the method comprises adding about 1 ppm to 10 ppm of the cationic oligomer to the pygas emulsion. In some embodiments, the molecular weight of the cationic oligomer is about 500 g/mol to 1000 g/mol. In some embodiments, the oligomer consists essentially of a homo-oligomer comprising repeat units derived from (2,3-epoxypropyl)trialkylammonium chloride). In some embodiments, the cationic oligomer comprises a net charge of about +3 to +20. In some embodiments, the adding and the collecting are carried out continuously. In some embodiments, the collected water phase is applied to a water recycling loop within the ethylene manufacturing plant.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1:
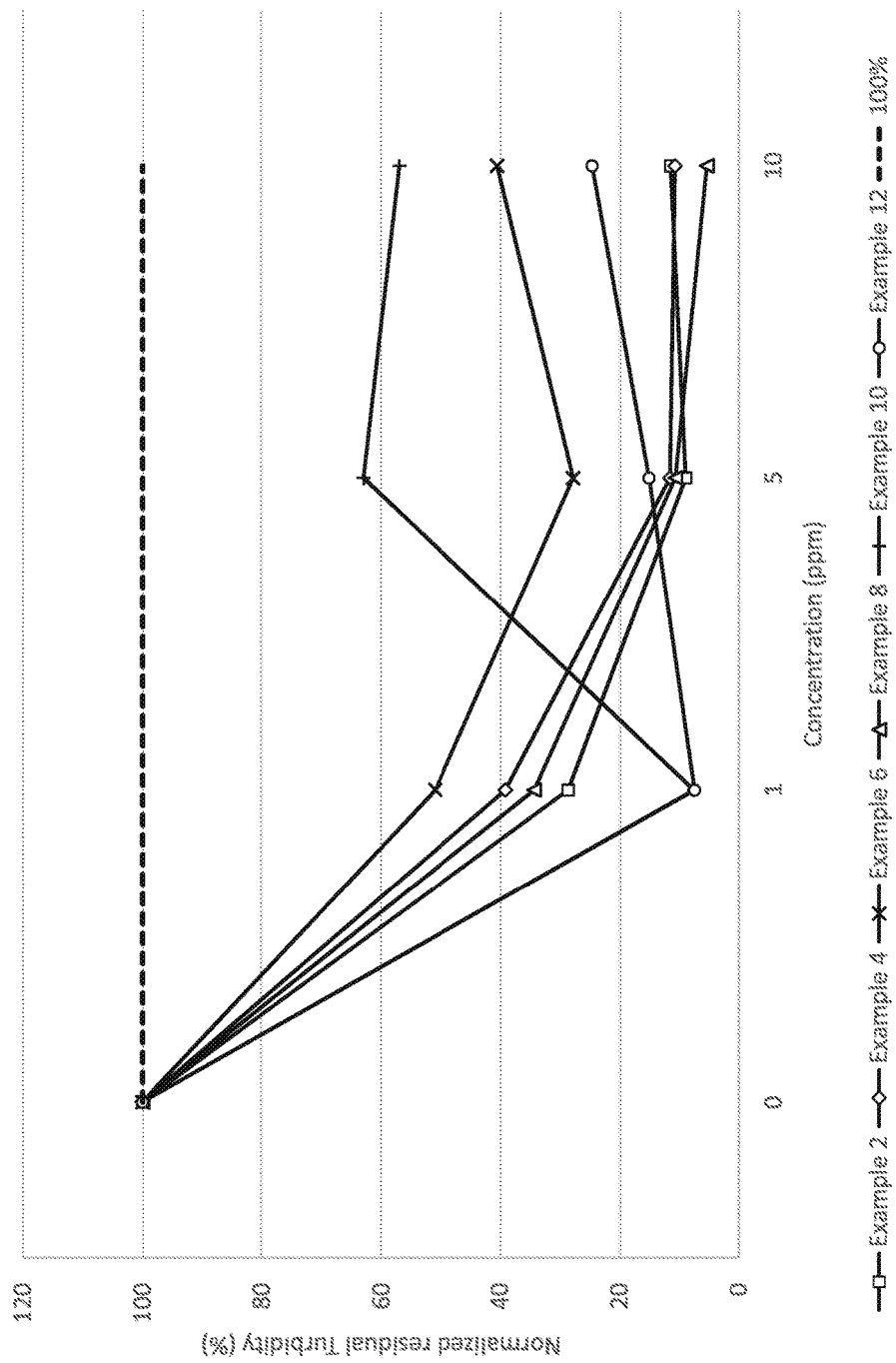
FIG. 1 is a plot of normalized turbidity of a pygas emulsion as a function of ppm of the indicated emulsion breaker at pH of 8-9.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "pygas" is a term of art and shorthand for "pyrolysis gasoline". The term indicates a mixture of petroleum based products that condenses along with water in the quench water tower of an ethylene manufacturing plant, wherein the mixture is less dense than water. Pygas is a variable mixture of hydrocarbons and other byproducts, wherein the mixture components and amounts are determined by the feedstock and pyrolysis conditions employed in the ethylene manufacturing plant. As determined by context and/or unless otherwise specified, pygas includes one or more aromatic compounds and a mixture of alkanes and alkenes having at least 5 carbons, wherein a majority (i.e. more than 50 wt %) of the alkane/alkene component is $C_5$-$C_{12}$. In some embodiments, pygas is rich in benzene (20 wt %-45 wt %). In some embodiments pygas contains appreciable quantities of highly reactive olefins and diolefins such as styrene, isoprene, piperylenes, cyclopentadienes, and combinations thereof. In some embodiments pygas further includes components such as $C_1$-$C_5$ organic acids.

Unless otherwise specified, or in context, "pygas" includes both pygas and pygas-pytar mixtures. In pygas-pytar mixtures, a pytar is co-dissolved or co-emulsified within a pygas or a pygas emulsion, resulting in a highly variable density and viscosity profile of the pytar-pygas mixture.

As used herein, the term "pytar" is a term of art and shorthand for "pyrolysis tar". The term indicates a mixture of petroleum based products that condenses along with water in the quench water tower of an ethylene manufacturing plant, wherein the mixture is denser than water. The term indicates a mixture of $\geq C_{12}$ alkanes/alkenes and/or polyaromatic hydrocarbons including, for example, anthracene, naphthtalene, phenanthrene, pyrene, chrysene, fluoranthene, and others as well as mixtures of two or more thereof and with similar compounds along with variants that have a random distribution of substituents such as methyl, ethyl, and higher alkyl or alkenyl substituents.

As used herein, the term "surfactant" means a single molecule having at least one hydrophilic group and at least one hydrophobic group, wherein the molecule is capable of spontaneous self-aggregation.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of non-limiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Disclosed herein is a method of resolving emulsions comprising, consisting essentially of, or consisting of pygas and ethylene quench water, wherein the resolving is accomplished at a temperature of about 60° C. to 100° C. Such emulsions are referred to herein as "pygas emulsions." In some embodiments, the pygas emulsion includes a pytar. For example, some pygas emulsions include about 0.01 wt % to as much as about 20 wt % pytar as a percent of the non-aqueous emulsion component, where the pytar amount depends on the individual equipment employed for cracking and the feedstock. In embodiments, the pygas in the emulsion includes about 0.05 wt % to 20 wt % pytar, or about 0.1 wt % to 20 wt %, or about 0.5 wt % to 20 wt %, or about 1 wt % to 20 wt %, or about 0.01 wt % to 15 wt %, or about 0.01 wt % to 10 wt %, or about 0.01 wt % to 5 wt %, or about 0.01 wt % to 3 wt %, or about 0.01 wt % to 1 wt %, or about 0.1 wt % to 3 wt % pytar based on the weight of the pygas in the pygas emulsion. The methods of the invention are suitable to address the full range of pygas-pytar ratios known by those of skill to arise in pygas emulsions.

Using the methods of the invention, a pygas emulsion is treated with an effective amount of a water-soluble cationic oligomer to break (demulsify) the emulsion and resolve the components into a water phase and a pygas phase that can subsequently allow the phases to be substantially independently collected. The resolution is advantageously carried out under conditions present in the quench tower or the oil/water separator; thus, the pygas emulsions do not need to be isolated, cooled, or further processed prior to addition of the cationic oligomer. The oligomer is advantageously added as a solution in water to the quench tower during the conventional condensation of pygas and process water therein. Since the oligomers are fully water soluble, such solutions are easily made.

Water Soluble Cationic Oligomers.

The oligomers useful to resolve pygas emulsions includes at least 3, and as many as 20 pendant ammonium moieties. By "pendant" it is meant that the ammonium moiety is not present within the backbone of the oligomer main chain, and instead the ammonium moiety is pendant to the main chain. The oligomer comprises, consists essentially of, or consists of repeat units derived from, or attributable to glycidyl trialkylammonium chloride ((2,3-epoxypropyl)trialkylammonium chloride). The oligomer has a structure corresponding to the formula

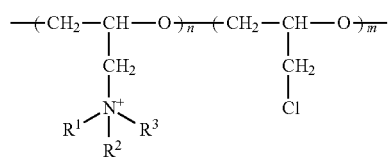

wherein $R^1$, $R^2$, and $R^3$ are alkyl groups having 1 to 3 carbon atoms, and the ratio of n:m is about 10:1 to 1,000,000:1, or about 100:1 to 1,000,000:1, or about 1000:1 to 1,000,000:1, or about 10,000:1 to 1,000,000:1; and further wherein the sum of n+m is about 3 to 20, or about 4 to 20, or about 5 to 20, or about 6 to 20, or about 3 to 18, or about 3 to 16, or about 3 to 14, or about 3 to 12, or about 3 to 10, or about 3 to 8, or about 4 to 10, or about 4 to 8, or about 4 to 6 as an average such as a weight average molecular weight. In some embodiments, m=0 or m is substantially 0 (that is, no measurable amount of repeat units attributable to m is detected. In such embodiments, the oligomer is a homo-oligomer. The anion associated with the ammonium moiety is chloride, bromide, fluoride, iodide, or an organic counterion having 1 to 3 anionic moieties; suitable organic counterions include, for example, acetate, citrate, and the like. In embodiments where m=0, $R^1$, $R^2$, and $R^3$ are methyl groups, and the anion associated with the ammonium moiety is chloride, the oligomer repeat unit has the structure assigned to CAS No. 51838-31-4.

One of skill will appreciate that a variety of reaction conditions are suitably used to form either linear or branched oligomers of epihalohydrin, which are well known polymers. The reaction of the polyepihalohydrin with trialkylamine to form the corresponding 2,3-epoxypropyltrialkylammonium halide is well understood in the literature.

In a representative example of synthesis useful in embodiments to form the cationic oligomers, James D. McClure, *J. Org. Chem.*, Vol. 35, No. 6, pp. 2059-2061 (1970), describes a process for the preparation of glycidyltrimethylammonium chloride by reacting epichlorohydrin with trimethylamine. The reaction is illustrated by the following equation:

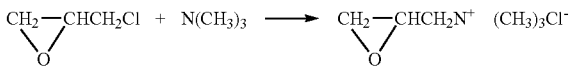

This reaction is best carried out in an aprotic solvent such as ethers, ketones, and esters in which 2,3-epoxypropyltrialkylammonium chloride is insoluble. Preparation of 2,3-epoxytrimethylpropylammonium bromide by reacting epibromohydrin with trimethylamine is also described. U.S. Pat. No. 3,475,458 discloses the preparation of crystalline glycidyltrimethylammonium chloride of high epoxide level, useful in the production of starch ethers, by reacting epichlorohydrin and trimethylamine in a solvent selected from saturated hydrocarbon ether, lower alkyl ketone, lower alkyl alkanoate and chloroform-hydrocarbon mixtures. U.S. Pat. No. 4,066,673 discloses a process for the preparation of 1,2-epoxy propyl trialkylammonium chloride in a methanol solution. Epichlorohydrin is first dissolved in methanol and then a stoichiometric amount of trialkylamine (for example, trimethylamine or triethylamine) in methanol is slowly added thereto.

It is also known to prepare 2,3-epoxypropyltrialkylammonium chloride by a method which involves reacting epoxy compounds, particularly epichlorohydrin, with an acid salt of a trialkylamine, particularly trimethylamine hydrochloride, in aqueous media, followed by treatment with caustic. Any of these methods, as well as others found in the literature, are usefully employed to form the oligomers useful in the methods of the invention as will be appreciated by one of skill.

Another useful embodiment of the cationic oligomers related to the linear oligomers described above is a branched oligomer wherein a mole of glycerol (having three hydroxyl moieties) or a mole of pentaerythritol (having four hydroxyl moieties) or a simple sugar or sugar alcohol molecule having 5 or 6 hydroxyl moieties is reacted with at least 3 moles of an epihalohydrin, followed by reaction with trialkylamine to produce the corresponding trialkylammonium halide functional branched oligomer. One such method for forming a 3-arm branched 2,3-epoxypropyltrialkylammonium halide polymer employing glycerol as a starting material is described, for example, in U.S. Pat. No. 8,697,615.

In some embodiments the oligomer includes about 3 to 20 cationic moieties (moieties bearing a cationic charge of +1) per molecule; stated differently, the cationic oligomers have a net charge of about +3 to +20. In some embodiments the oligomer includes about 4 to 20, or about 5 to 20, or about 3 to 20, or about 3 to 15, or about 3 to 10, or about 3 to 8, or about 4 to 10, or about 4 to 8 cationic moieties per molecule.

In some embodiments the oligomer has an average molecular weight of about 400 g/mol to 2500 g/mol, or about 500 g/mol to 2000 g/mol, or about 600 g/mol to 2000 g/mol, or about 700 g/mol to 2000 g/mol, or about 400 g/mol to 2000 g/mol, or about 400 g/mol to 1800 g/mol, or about 400 g/mol to 1600 g/mol, or about 400 g/mol to 1400 g/mol, or about 400 g/mol to 1200 g/mol, or about 400 g/mol to 1000 g/mol, or about 400 g/mol to 900 g/mol, or about 500 g/mol to 1500 g/mol, or about 500 g/mol to 1000 g/mol, or about 600 g/mol to 1000 g/mol, or about 600 g/mol to 900 g/mol. In some embodiments the average is a weight average molecular weight.

The cationic oligomers do not self-aggregate in water. While the oligomers include organic content that can be considered "lipophilic", and without wishing to be limited by theory, we believe that the contribution of the lipophilic portion of the oligomer to the familiar "hydrophilic/lipophilic balance" (commonly referred to as HLB) defining surfactants is too small to give rise to spontaneous self-aggregation. Self-aggregation is a hallmark characteristic defining a surfactant. Thus, the oligomers are characterized as non-surfactants.

Method of Resolving Pygas Emulsions

According to the methods of the invention, applying an oligomer to an emulsion within a quench water tower during operation thereof in an ethylene production plant is followed by collecting one or more resolved emulsion components. The emulsion components comprise a water phase and a pygas phase. In some embodiments, the water phase is collected for further use, such as recycling in the water recycling loop of an ethylene production plant. The oligomers of the invention are suitably added in neat form to a pygas emulsion within or external to the quench water tower or the quench water system. However, in some embodiments, the oligomers are added as an aqueous solution. In some such embodiments, the oligomer solutions useful in the methods of the invention include between about 0.1 wt % and 30 wt % of the oligomer. In embodiments where the oligomer solution is added as the water source in a quench water tower, for example, a more dilute solution is required, such as about 0.1 wt % to 2 wt % oligomer in water. On the other hand, where the oligomer solution is a concentrate added as a fraction of the water source in a quench water tower, a concentrate having more than about 2 wt % and up to about 30 wt % is formed. The invention is not limited by the concentration of the oligomer in the solution used to carry out the methods.

Other compounds usefully included in the oligomer solutions include antipolymerants (radical polymerization terminators or retardants), antioxidants, corrosion inhibitors, or oxygen scavengers.

The oligomer solution is applied to the base of the water quench tower using any one or more of several methods familiar to those of skill. In some embodiments the oligomer solution is applied to the water spray mechanism within the quench tower, such that oligomer solution is added to the pygas contemporaneously with the cooling process carried out therein. In some embodiments the oligomer solution is applied as a separate component to the water quench tower, for example using a separate inlet near the base thereof so as to add the oligomer directly to the base of the tower where the pygas emulsions are located. In some embodiments, within the water recycling loop, the oligomer solution is added after the water quench tower before the process water/emulsion enters the oil/water separator. In some embodiments, the oligomer solution is added before the process water/emulsion enters the coalescer unit. In still other embodiments, the oligomer solution is added after separating a portion of the process water/emulsion components in a primary oil/water separation unit and prior to the remaining process water/emulsion components entering a secondary o/w separator. In some embodiments, the oligomer solution is added batchwise. In some embodiments, the oligomer solution is added continuously. In some embodiments, the application of the oligomer solution is manual; in other embodiments, the application is automated.

The targeted concentration of oligomer in the pygas emulsions ranges from about 0.1 ppm to 200 ppm, for example about 0.1 ppm to 100 ppm, or about 0.1 ppm to 90 ppm, or about 0.1 ppm to 80 ppm, or about 0.1 ppm to 70 ppm, or about 0.1 ppm to 60 ppm, or about 0.1 ppm to 50 ppm, or about 0.1 ppm to 40 ppm, or about 0.1 ppm to 30 ppm, or about 0.1 ppm to 20 ppm, or about 0.1 ppm to 10 ppm, 0.1 ppm to 5 ppm, or about 0.1 ppm to 2 ppm, or about 0.1 ppm to 1 ppm, or about 0.1 ppm to 100 ppm, or about 0.2 ppm to 100 ppm, or about 0.3 ppm to 100 ppm, or about 0.4 ppm to 100 ppm, or about 0.5 ppm to 100 ppm, or about 0.6 ppm to 100 ppm, or about 0.7 ppm to 100 ppm, or about 0.8 ppm to 100 ppm, or about 0.9 ppm to 100 ppm, or about 1 ppm to 100 ppm, or any amount or range within about 0.1 ppm to 200 ppm in increments of about 0.1 ppm, such as about 2.4 ppm to 10.0 ppm, or about 0.3 ppm to 1.8 ppm, and the like without limitation. The concentration of the oligomer solution and the rate of oligomer solution application to the quench water tower are suitably adjusted by one of skill to account for the volume of the pygas emulsion and the rate of formation thereof.

It is an advantage of the methods of the invention that if the targeted amount of oligomer in the quench tower is inadvertently overshot, there are no deleterious effects on emulsion breaking. Such deleterious effects include stabilization of the emulsion, making subsequent separation even more difficult; this is a common observation in conventional pygas emulsion breakers. Such effects are not observed in conjunction with the use of the oligomer solutions described herein. Without wishing to be limited by theory, we believe that the absence of such deleterious effects are due to the characterization of the emulsion breaker as non-surfactant. In some embodiments, the targeted amount of oligomer is exceeded by up to 500% without observing deleterious effects on emulsion breaking. Thus, in a representative embodiment, if the targeted amount of oligomer is e.g. 5 ppm, addition of up to 30 ppm does not result in observable deleterious effects on emulsion breaking. In embodiments, the targeted amount of oligomer is exceeded by about 1% to 500% without observing deleterious effects on emulsion breaking, for example about 1% to 400%, or about 1% to 300%, or about 1% to 200%, or about 100% to 500%, or about 200% to 500%, or about 300% to 500%, or about 400% to 500% without observing deleterious effects on emulsion breaking.

In some embodiments, the water phase collected from one or more resolved emulsions wherein a method of the invention was employed to resolve the emulsion includes about 1% to 25% lower total organic carbon content than a water phase collected from a resolved emulsion wherein no cationic oligomer was added to the emulsion. In some embodiments, such collected water phase from one or more resolved emulsions includes about 1% to 20% lower total organic carbon content than a water phase collected from a resolved emulsion wherein no cationic oligomer was added to the emulsion, or about 1% to 15% lower, or about 1% to 10% lower, or about 1% to 8% lower, or about 1% to 6% lower, or about 2% to 25% lower, or about 5% to 25% lower, or about 10% to 25% lower total organic carbon content than a water phase collected from a resolved emulsion wherein no cationic oligomer was added to the emulsion.

In some embodiments, the water phase collected from one or more resolved emulsions wherein a method of the invention was employed to resolve a pygas emulsion is characterized by a pH of about 5 to 6 and turbidity that is about 50% to 30% of the turbidity of a water phase having pH of about 5 to 6 and collected from one or more pygas emulsions wherein no emulsion breaker was employed. In some such embodiments, the oligomer is added to resolve the emulsion at about 1 ppm to 10 ppm based on the total amount of emulsion present in the base of a quench water tower. However, the same results are achieved when up to 200 ppm of the oligomer is added. It is an advantage of the methods of the invention that more than 1 ppm, for example more than 10 ppm oligomer may be added to the contents of the base of a quench water tower without causing a rise in turbidity from the levels recited above. Thus, by employing the methods of the invention, the level of oligomer required to resolve one or more pygas emulsions can be exceeded without causing substantial amounts of organic compounds to be incorporated within the water phase and thus within the water recycling loop of the ethylene production facility.

In some embodiments, the water phase collected from one or more resolved emulsions wherein a method of the invention was employed to resolve a pygas emulsion is characterized by a pH of about 8 to 9 and normalized turbidity that is about 30% to 5% of the turbidity of a water phase having pH of about 8 to 9 that is collected from one or more pygas emulsions wherein no emulsion breaker was employed. In some such embodiments, the oligomer is added to resolve the emulsion at about 1 ppm to 10 ppm based on the total amount of emulsion present in the base of a quench water tower. However, the same results are achieved when up to 200 ppm of the oligomer is added. It is an advantage of the methods of the invention that more than 1 ppm, for example more than 10 ppm oligomer may be added to the contents of the base of a quench water tower without causing a rise in turbidity. Thus, by employing the methods of the invention, the level of oligomer required to resolve one or more pygas emulsions having a water phase pH of about 8 to 9 can be exceeded without causing substantial amounts of organic compounds to be incorporated within the water phase and thus within the water recycling loop of the ethylene production facility.

The presently employed oligomers are advantageous over the use of conventional cationic polymers employed in the present application due to their low molecular weight and high degree of cationic functionality: the oligomers dissolve readily in water with effectively no time needed for chain uncoiling and hydration, such as is required for polymers, e.g. compounds having molecular weights over about 5,000 g/mol and in particular molecular weights over about 20,000 g/mol or even over about 100,000 g/mol. The oligomers are thus easily, quickly and completely dissolved in water to form a solution thereof. In embodiments, an oligomer solution employed to resolve a pygas emulsion comprises, consists essentially of, or consists of water and a cationic oligomer. The application of the oligomer to the pygas emulsion, even at temperatures of about 60° C. to 100° C., or about 70° C. to 100° C., or about 80° C. to 100° C., or about 60° C. to 90° C., or about 60° C. to 80° C. does not cause foaming, viscosification, or fouling of equipment. Additionally, the oligomers do not cause precipitation of emulsion components.

Once the oligomers are added to the ethylene quench water tower, the mixture thus formed is naturally agitated as it moves through the ethylene manufacturing system. The oligomers of the invention cause the emulsified pygas phase to separate from the water phase, where it is collected and returned to the water loop within the ethylene manufacturing plant.

In embodiments, the methods of the invention include allowing a period of time to elapse between addition of the oligomer to the quench water tower and collection of a water phase therefrom. Such a period of time is provided to allow the pygas emulsion to resolve into the pygas phase and water phase. In some such embodiments, the period of time is about 10 seconds (s) to about 60 minutes (min), for example about 20 s to 60 min, or about 30 s to 60 min, or about 40 s to 60 min, or about 50 s to 60 min, or about 1 min to 60 min, or about 5 min to 60 min, or about 10 min to 60 min, or about 20 min to 60 min, or about 30 min to 60 min, or about 40 min to 60 min, or about 10 s to 55 min, or about 10 s to 50 min, or about 10 s to 45 min, or about 10 s to 40 min, or about 10 s to 30 min, or about 5 min to 45 min, or about 10 min to 45 min, or about 10 min to 30 min, or about 15 min to 45 min, or about 15 min to 30 min, or about 20 min to 45 min, or about 20 min to 30 min. Between the addition of the oligomer to the quench water tower and the collection of a water phase therefrom, the agitation within the base of the quench water tower leads to breaking of the emulsion, that is, substantial separation of the pygas emulsion into two phases, the two phases comprising a pygas phase and a water phase. In some embodiments, the oligomer is added to the base of the water quench tower in a continuous fashion; in such embodiments, one of skill will understand that the addition is suitably metered to provide a sufficient period of time to resolve a pygas emulsion forming on a continuous basis, along with continuous collection and optional recycling of the resolved water phase.

EXPERIMENTAL

The following examples are intended to show experimental embodiments of the invention. The embodiments are not limiting to the scope of the claims appended hereto. It will be recognized that various modifications and changes may be made without following the experimental embodiments described herein, further without departing from the scope of the claims.

Examples 1-12

Process water obtained from a quench water tower base portion (feedstock: naphtha and gas condensates) was divided into two portions. The first portion was adjusted to a pH of 8-9 using ethanolamine. The second portion was adjusted to pH of 5-6 using formic acid. The low pH and high pH process water was separately combined with pygas (same plant and same feedstock as the process water) to form low pH and high pH emulsions by preheating the components to 80° C., followed by blending the components in a 1:1 volume ratio in a closed water jacketed glass vessel at using a Heidolph MR Hei-Tec magnetic stirrer (obtained from Heidolph Instruments GmbH & Co of Schwabach, Germany) and a teflon coated magnet stirring at 1000 rpm for 5 min at 80° C.

Figure 2:
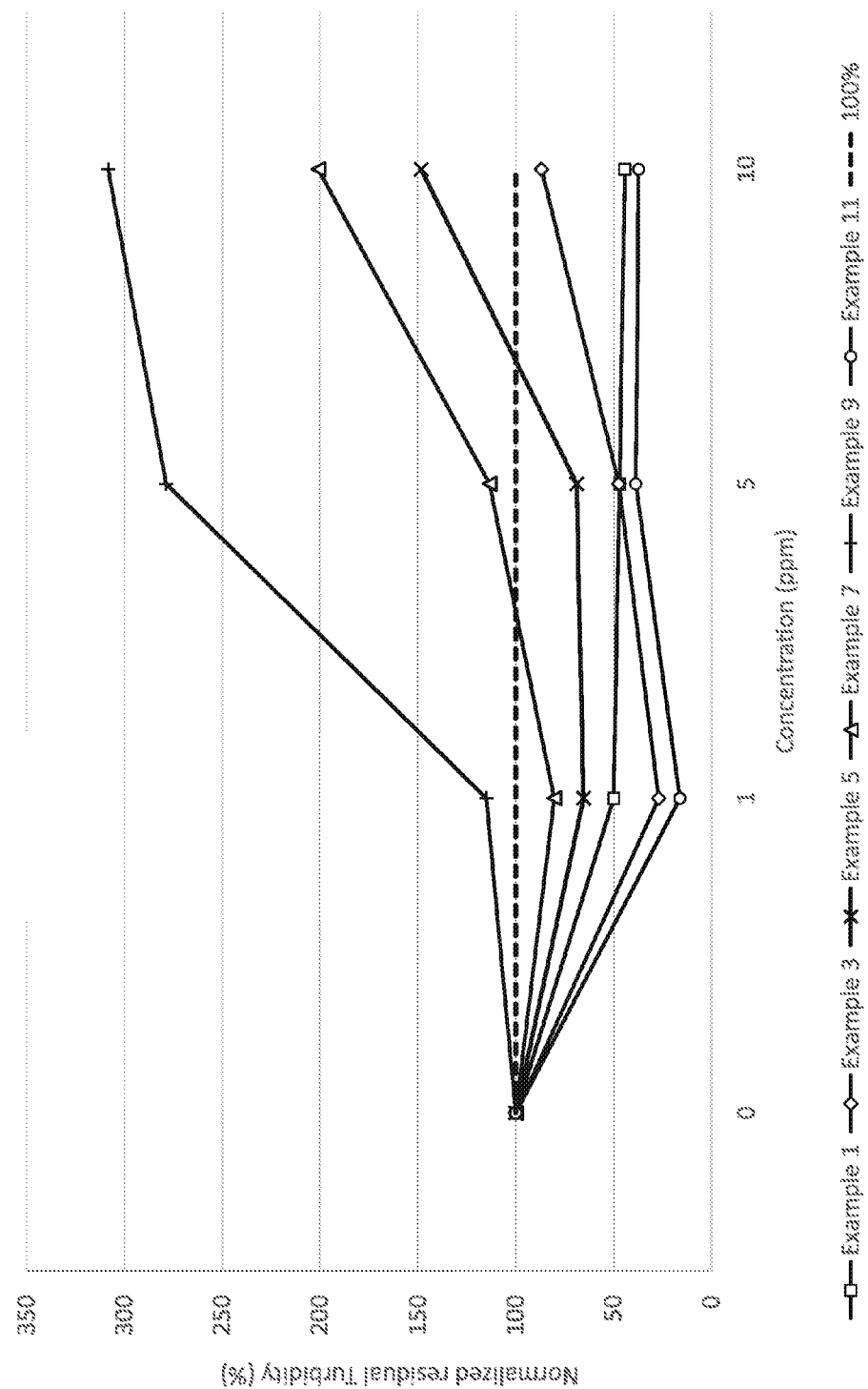
FIG. 2 is a plot of normalized turbidity of a pygas emulsion as a function of ppm of the indicated emulsion breaker at pH of 5-6.

After mixing was complete, the results were analyzed by turbidity testing (using a EUTECH TN-100, obtained from Cole Parmer N.A. of Vernon Hills, Ill.) as Controls C1 and C2 in Table 1. Then the experiments were repeated with addition of the emulsion breakers shown in Table 1; the additions were metered to provide 1, 5, or 10 ppm of the selected emulsion breaker. The turbidity measurements in the pH 8-9 test are shown in FIG. 1. The turbidity measurements in the pH 5-6 test are shown in FIG. 2. The C1 and C2 Control samples are included by normalization of the results of Examples 1-12.

TABLE 1

Selected emulsion breaker compounds in Examples 1-10.

| Example No. | pH | Molecular weight (g/mol) | Emulsion Breaker |
|---|---|---|---|
| 1 | 5-6 | 750 | EC6164A available from Nalco Champion |
| 2 | 8-9 | 750 | EC6164A available from Nalco Champion |
| 3 | 5-6 | $2 \times 10^6$ and $1.1 \times 10^5$ | EC6577A available from Nalco Champion of Houston, TX |
| 4 | 8-9 | $2 \times 10^6$ and $1.1 \times 10^5$ | EC6577A available from Nalco Champion |
| 5 | 5-6 | $2 \times 10^6$ and $1.1 \times 10^5$ | EC3379A available from Nalco Champion |
| 6 | 8-9 | $2 \times 10^6$ and $1.1 \times 10^5$ | EC3379A available from Nalco Champion |
| 7 | 5-6 | 2000 | EC3379A available from Nalco Champion |
| 8 | 8-9 | 2000 | EC3379A available from Nalco Champion |
| 9 | 5-6 | $1.9 \times 10^5$ | Nalco 8103Plus available from Nalco Champion |
| 10 | 8-9 | $1.9 \times 10^5$ | Nalco 8103Plus available from Nalco Champion |
| 11 | 5-6 | | EC6730A available from Nalco Champion |
| 12 | 8-9 | | EC6730A available from Nalco Champion |
| C1 | 5-6 | n/a | None |
| C2 | 8-9 | n/a | None |

Examples 11-20

Figure 3:
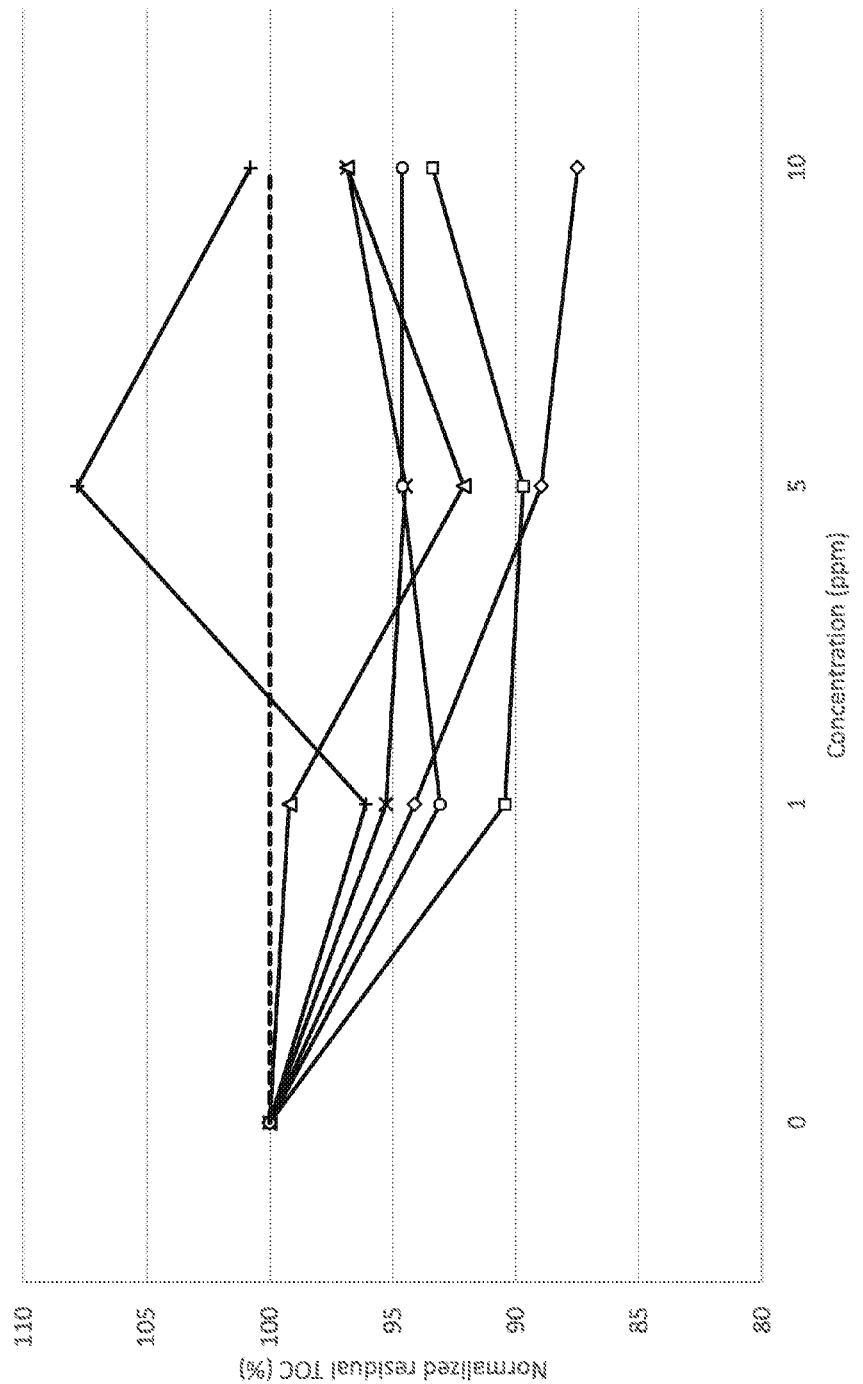
FIG. 3 is a plot of normalized total organic carbon in the water phase of a resolved emulsion as a function of ppm of the indicated emulsion breaker at pH of 8-9.
Figure 4:
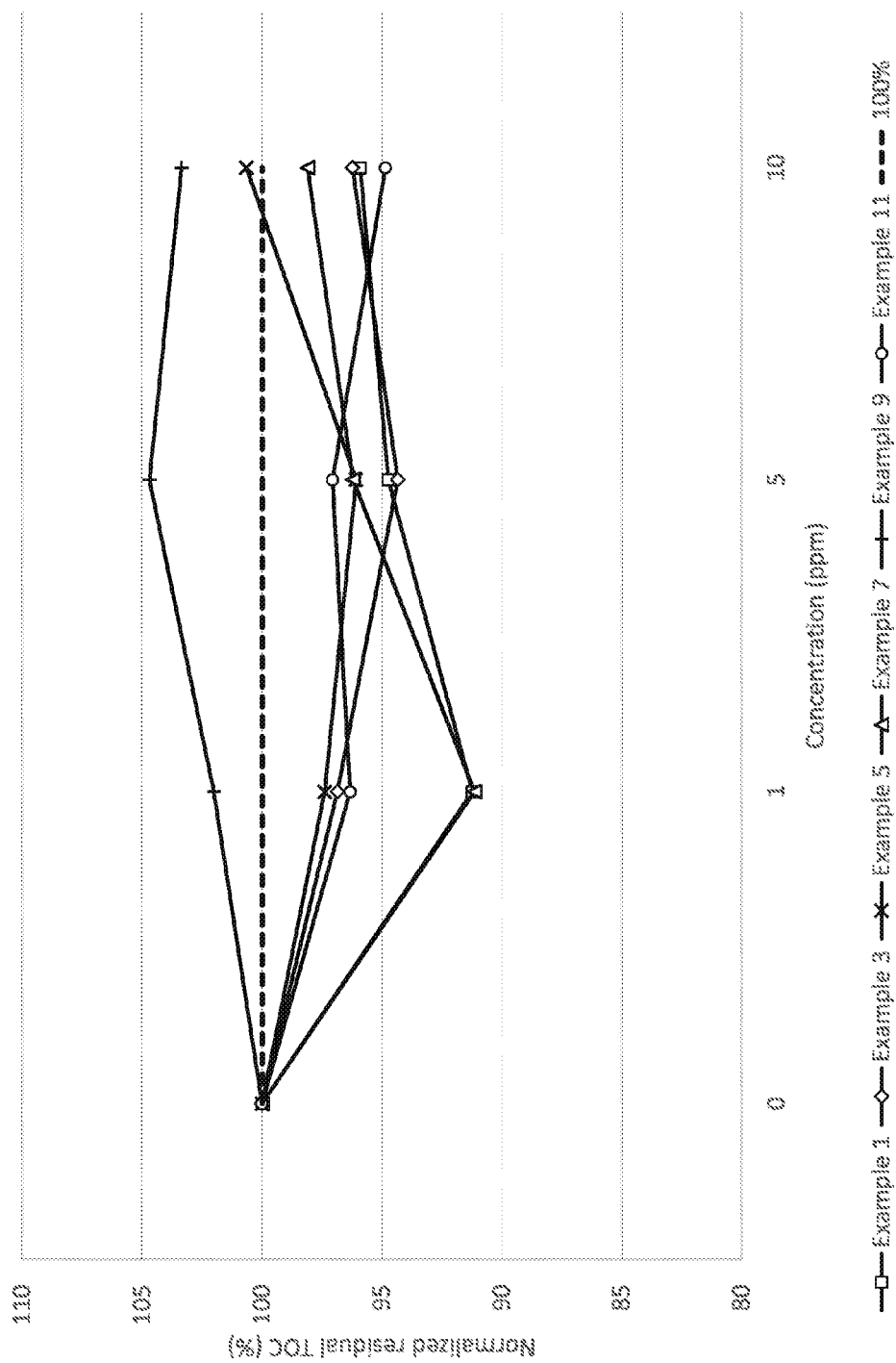
FIG. 4 is a plot of normalized total organic carbon in the water phase of a resolved emulsion as a function of ppm of the indicated emulsion breaker at pH of 5-6.

At the end of the testing of Examples 1-10, the "broken", or resolved, emulsions include two distinct phases: a first phase that is primarily pygas and a second phase that is primarily water. The water phase was carefully isolated from each of the resolved emulsions and tested for total organic carbon (TOC). Results of TOC analysis for the pH 8-9 water phase is shown in FIG. 3. Results of TOC analysis for the pH 5-6 test are shown in FIG. 4.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A method of resolving pygas emulsions, the method comprising: adding about 0.1 ppm to 200 ppm of a cationic oligomer to a pygas emulsion present within a water recycling loop of an ethylene manufacturing plant; and collecting a water phase resolved therefrom, wherein the cationic oligomer has a molecular weight of about 400 g/mol to 2000 g/mol and comprises repeat units derived from (2,3-epoxypropyl)trialkylammonium chloride.

2. The method of claim 1 wherein the pygas emulsion is present in a water quench tower or in an oil/water separator.

3. The method of claim 1 wherein the pygas emulsion is present in the base of the water quench tower at about 60° C. to 100° C.

4. The method of claim 1 wherein the pygas emulsion comprises a pytar fraction.

5. The method of claim 1 comprising adding about 1 ppm to 10 ppm of the cationic oligomer to the pygas emulsion.

6. The method of claim 1 wherein the molecular weight of the cationic oligomer is about 500 g/mol to 1000 g/mol.

7. The method of claim 1 wherein the oligomer consists essentially of a homo-oligomer comprising repeat units derived from (2,3-epoxypropyl)trialkylammonium chloride.

8. The method of claim 1 wherein the cationic oligomer comprises a net charge of about +3 to +20.

9. The method of claim 1 wherein the addition and the collection are carried out continuously.

10. The method of claim 1 wherein the collected water phase is applied to a water recycling loop within the ethylene manufacturing plant.

11. A resolved pygas emulsion present within a water recycling loop of an ethylene manufacturing plant, the resolved pygas emulsion comprising a pygas phase and water phase, the resolved pygas emulsion comprising a cationic oligomer
comprising repeat units derived from a (2,3-epoxypropyl) trialkylammonium chloride and having a molecular weight of about 400 g/mol to 2000 g/mol and a net charge of about +3 to +20.

12. The resolved pygas emulsion of claim 11 wherein the water phase comprises about 1% to 25% lower total organic carbon content than a water phase of a resolved emulsion wherein no cationic oligomer was added to the emulsion.

13. The resolved pygas emulsion of claim 11 characterized by the absence of precipitated pygas emulsion components.

14. The resolved pygas emulsion of claim 11 wherein the pygas phase comprises a pytar fraction.

15. The resolved pygas emulsion of claim 11 wherein the 2,3-epoxypropyl)trialkylammonium chloride is 2,3-epoxypropyl)trimethylammonium chloride.

* * * * *